US012638359B2

(12) United States Patent
Vermeulen

(10) Patent No.: US 12,638,359 B2
(45) Date of Patent: May 26, 2026

(54) AUTOMATED AERODYNAMIC TESTING SYSTEM

(71) Applicant: FCA US LLC, Auburn Hills, MI (US)

(72) Inventor: Chad Vermeulen, Windsor (CA)

(73) Assignee: FCA US LLC, Auburn Hills, MI (US)

( * ) Notice: Subject to any disclaimer, the term of this patent is extended or adjusted under 35 U.S.C. 154(b) by 278 days.

(21) Appl. No.: 18/495,859

(22) Filed: Oct. 27, 2023

(65) Prior Publication Data

US 2025/0137874 A1    May 1, 2025

(51) Int. Cl.
  G01M 9/04        (2006.01)
  G01M 9/06        (2006.01)

(52) U.S. Cl.
  CPC .............. G01M 9/04 (2013.01); G01M 9/06 (2013.01)

(58) Field of Classification Search
  None
  See application file for complete search history.

(56) References Cited

U.S. PATENT DOCUMENTS

| | | | |
|---|---|---|---|
| 4,593,558 A | 6/1986 | Barske | |
| 7,077,001 B2 * | 7/2006 | Carlson | G01M 9/06 73/170.01 |
| 8,042,386 B2 * | 10/2011 | Kato | G01M 17/0074 73/147 |
| 8,155,794 B2 * | 4/2012 | Mangalam | G01M 9/06 700/282 |
| 8,783,098 B2 | 7/2014 | Smith | |

FOREIGN PATENT DOCUMENTS

| | | | | | |
|---|---|---|---|---|---|
| CN | 116519256 A | * | 8/2023 | ............. | G05D 27/02 |
| JP | 2011022015 A | * | 2/2011 | | |
| JP | 2021047086 A | * | 3/2021 | | |

OTHER PUBLICATIONS

MD. Rezaul Karim Sikder, "Effect of Advanced Aerodynamic Designs for Drag Reduction in a Passenger Bus," Dept. of Mechanical Engineering Dhaka University of Engineering & Technology, Gazipur, Bangladesh, Jun. 2021.

Mateus Carvalho, et al., "Modelling Precipitation Intensity Impacting Vehicles in Motion," Preprints, Jul. 13, 2023.

H. Hangan, et al., "Weather Aerodynamic Adaptation for Autonomous Vehicles: A Tentative Framework," Transactions of the Canadian Society for Mechanical Engineering, Apr. 12, 2022.

* cited by examiner

*Primary Examiner* — Peter J Macchiarolo
*Assistant Examiner* — Jermaine L Jenkins
(74) *Attorney, Agent, or Firm* — Jeremy J. Klobucar

(57)        ABSTRACT

An aerodynamic testing system for determining the shape characteristics of a test object by employing a mixture of cold air and water vapor in an open-circuit wind tunnel. The system integrates a chiller and an air induction device to produce cold air that's combined with water vapor at temperatures at, around, or below freezing. A fluid dispersion device introduces water vapor into the tunnel. The wind tunnel walls are heated above freezing using an embedded heating element to prevent icy buildup. During testing, the test object is positioned on a specialized load cell equipped with multiple transducers and a support plate. The load cell measures aerodynamic forces on the test object. Concurrently, the support plate keeps the test object at or near freezing temperatures. All acquired data, including drag metrics and a 3D scan of the object, are systematically stored in a dedicated database or storage medium.

20 Claims, 7 Drawing Sheets

AUTOMATED AERODYNAMIC TESTING SYSTEM

FIELD

The present disclosure relates to an automated aerodynamic testing system.

BACKGROUND

This section provides background information related to the present disclosure which is not necessarily prior art.

Determining a drag coefficient of a vehicle is an important aspect of automotive design. Historically, clay models of vehicles are formed and subjected to wind tunnel testing to determine the drag coefficient of the vehicle. Even after widespread adoption of computer-aided design (CAD) tools, designers may still rely heavily on clay models during the design process.

The models may be placed in the wind tunnel and aerodynamically tested. After conducting the aerodynamic tests, the models may then be removed from the wind tunnel, reshaped by hand based on the feedback of those tests, and tested again in an iterative process to find a shape that produces the most favorable aerodynamic characteristics. Thus, this process requires a great deal of time such that the process is slow and costly. Accordingly, there is a need for an improved system and process that can decrease the amount of time and costs required to develop the most efficient aerodynamic profile for the vehicle.

SUMMARY

This section provides a general summary of the disclosure, and is not a comprehensive disclosure of its full scope or all of its features.

According to a first aspect of the present disclosure, there is provided a test system for modifying an aerodynamic shape of a test object. The test system may include an open-circuit wind tunnel configured for receipt of a mixture of cold air and water vapor; a heating element formed on walls of the open-circuit wind tunnel, the heating element being configured to heat the walls to a temperature above freezing; and a load cell configured to support the test object in the open-circuit wind tunnel during testing thereof, the load cell including a plurality of transducers and a coolant system for chilling the test object, wherein the transducers are configured to generate signals indicative of forces applied to the test object as the mixture of cold air and water vapor passes over the test object to determine amounts of drag created by the aerodynamic shape of the test object, and wherein the coolant system is configured to chill the test object to a temperature at, around, or below freezing.

According to the first aspect, the test system may further include a chiller located proximate an inlet of the open-circuit wind tunnel, an air induction device configured to draw air through the chiller before entering the inlet to form the cold air, and draw the cold air through the open-circuit wind tunnel toward the test object supported by the load cell, and a fluid dispersion device located downstream from the chiller for dispersing water vapor in the open-circuit wind tunnel, wherein the mixture of cold air and water vapor is at a temperature between 14 degrees F. and 32 degrees F. as it passes through the open-circuit wind tunnel.

According to the first aspect, the test system may further include a processing device in communication with the plurality of transducers and configured to store and analyze the signals indicative of the forces applied to the test object as the mixture of cold air and water vapor passes over the test object to determine the amounts of drag created by the aerodynamic shape of the test object.

According to the first aspect, the test system may further include wherein the coolant system includes a source of coolant configured to circulate between the source and a flow path provided in the test object.

According to the first aspect, the test system may further include a fluid source in communication with the fluid dispersion device, and a valve between the fluid source and the fluid dispersion device.

According to the first aspect, the test system may further include a temperature sensor downstream from the chiller for generating signals indicative of a temperature of the cold air.

According to the first aspect, the test system may further include a controller in communication with each of the chiller, the air induction device, the valve, and the temperature sensor.

According to the first aspect, the controller is configured to control the chiller based on the signal indicative of the temperature generated by the temperature sensor.

According to a second aspect of the present disclosure there is provided a method for modifying an aerodynamic shape of a test object. The method may include introducing the test object into an open-circuit wind tunnel and locating the test object onto a load cell including a coolant system configured to cool a temperature of the test object to a temperature at, around, or below freezing; activating a heating element formed on walls of the open-circuit wind tunnel, the heating element being configured to heat the walls to a temperature above freezing; activating an air induction device to draw a mixture of cold air and water vapor at a temperature at, around, or below freezing over the test object; and measuring forces exerted on the test object by the mixture of cold air and water vapor using the load cell, wherein as the mixture of cold air and water vapor passes over the test object that is cooled to the temperature at, around, or below freezing by the coolant system, the water vapor will freeze and collect at low pressure areas of the test object to change and improve the aerodynamic shape of the test object.

According to the second aspect, the method may also include periodically 3D scanning the test object to record the changes and improvement in the aerodynamic shape of the test object.

According to the second aspect, the method may also include storing the measured forces exerted on the test object by the mixture of cold air and water vapor and the corresponding 3D scans in a processing device; and identifying a most aerodynamically efficient shape of the test object based on the measured forces and corresponding 3D scans.

According to the second aspect, the mixture of cold air and water vapor is at a temperature between 14° F. and 32° F.

According to the second aspect, the test object is formed of a metal material to facilitate cooling by the coolant system.

According to a third aspect of the present disclosure, there is provided a test system for modifying an aerodynamic shape of a test object. The test system may include an open-circuit wind tunnel configured for receipt of a mixture of cold air and water vapor; a chiller located proximate an inlet of the open-circuit wind tunnel, an air induction device configured to draw air through the chiller before entering the inlet to form the cold air, and draw the cold air through the open-circuit wind tunnel toward the test object supported by a load cell, a fluid dispersion device located downstream from the chiller for dispersing water vapor into the open-circuit wind tunnel, wherein the mixture of cold air and water vapor is at a temperature between 14° F. and 32° F. as it passes through the open-circuit wind tunnel, and a heating element formed on walls of the open-circuit wind tunnel that is configured to heat the walls to a temperature above freezing and prevent the water vapor from collecting on the walls, wherein the load cell includes a plurality of transducers and a coolant system that is configured to cool the test object to a temperature at, around, or below freezing, and as the mixture of cold air and water vapor passes over the test object that is cooled to the temperature at, around, or below freezing by the coolant system, the water vapor will freeze and collect at low pressure areas of the test object to change and improve the aerodynamic shape of the test object, and the transducers are configured to generate signals indicative of forces applied to the test object by the mixture of cold air and water vapor as the mixture passes over the test object to determine as amounts of drag created by the aerodynamic shape of the test object are reduced by the change and improvement of the aerodynamic shape of the test object.

According to the third aspect, the test system may also include a processing device in communication with the plurality of transducers and configured to store and analyze the signals indicative of the forces applied to the test object as the mixture of cold air and water vapor passes over the test object. According to the third aspect, the test system may also include wherein the coolant system includes a coolant source configured to circulate a coolant to a flow path provided in the test object.

According to the third aspect, the test system may also include a fluid source in communication with the fluid dispersion device, and a valve between the fluid source and the fluid dispersion device.

According to the third aspect, the test system may also include a temperature sensor downstream from the chiller for generating signals indicative of a temperature of the cold air.

According to the third aspect, the test system may also include a controller in communication with each of the chiller, the air induction device, the valve, and the temperature sensor.

According to the third aspect, the controller is configured to control the chiller based on the signal indicative of the temperature generated by the temperature sensor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer, or section discussed below could be termed a second element, component, region, layer or section without departing from the teachings of the example embodiments.

Figure 1:
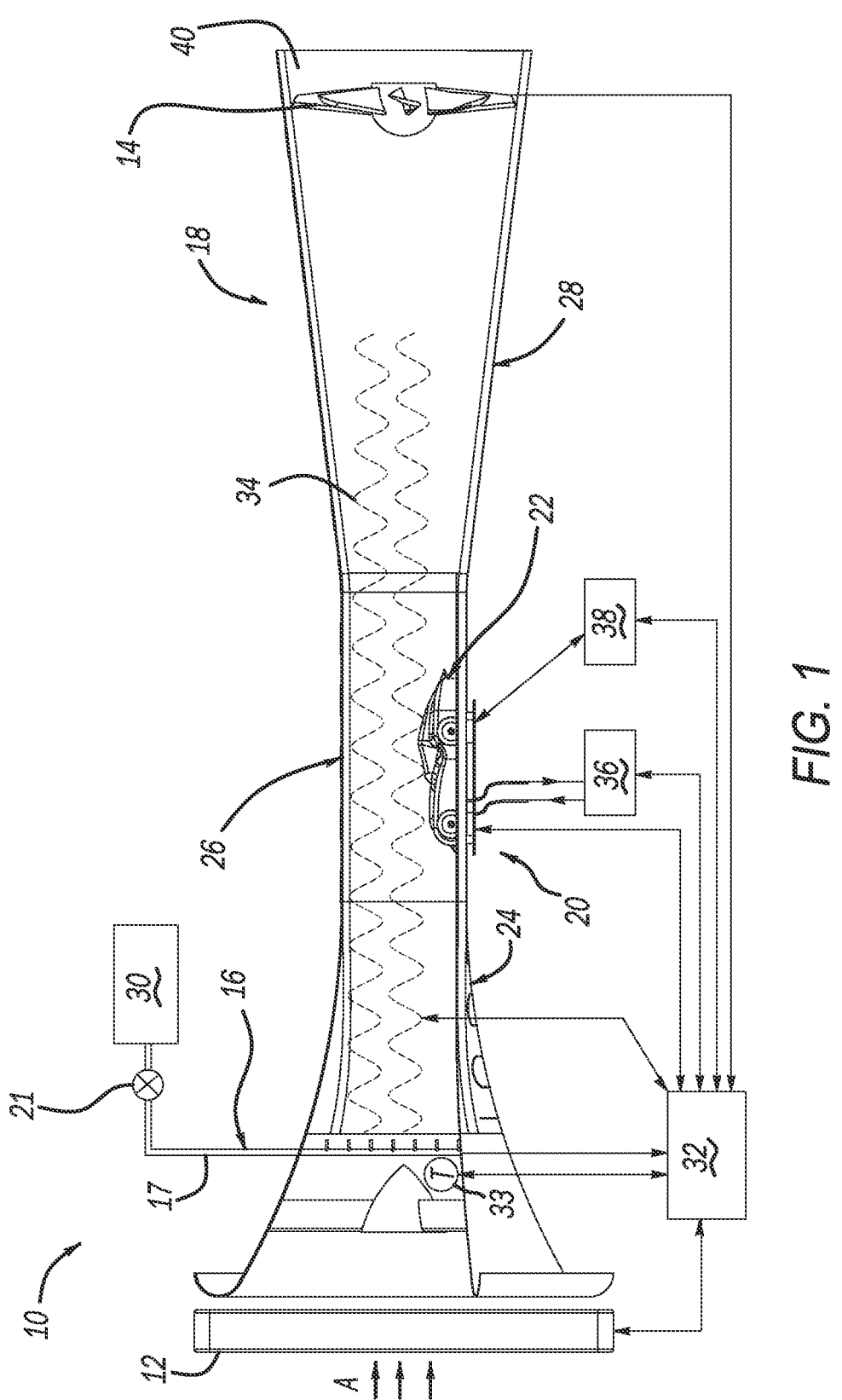
FIG. 1 is a cross-sectional view of an example aerodynamic testing system according to a principle of the present disclosure.
Figure 2:
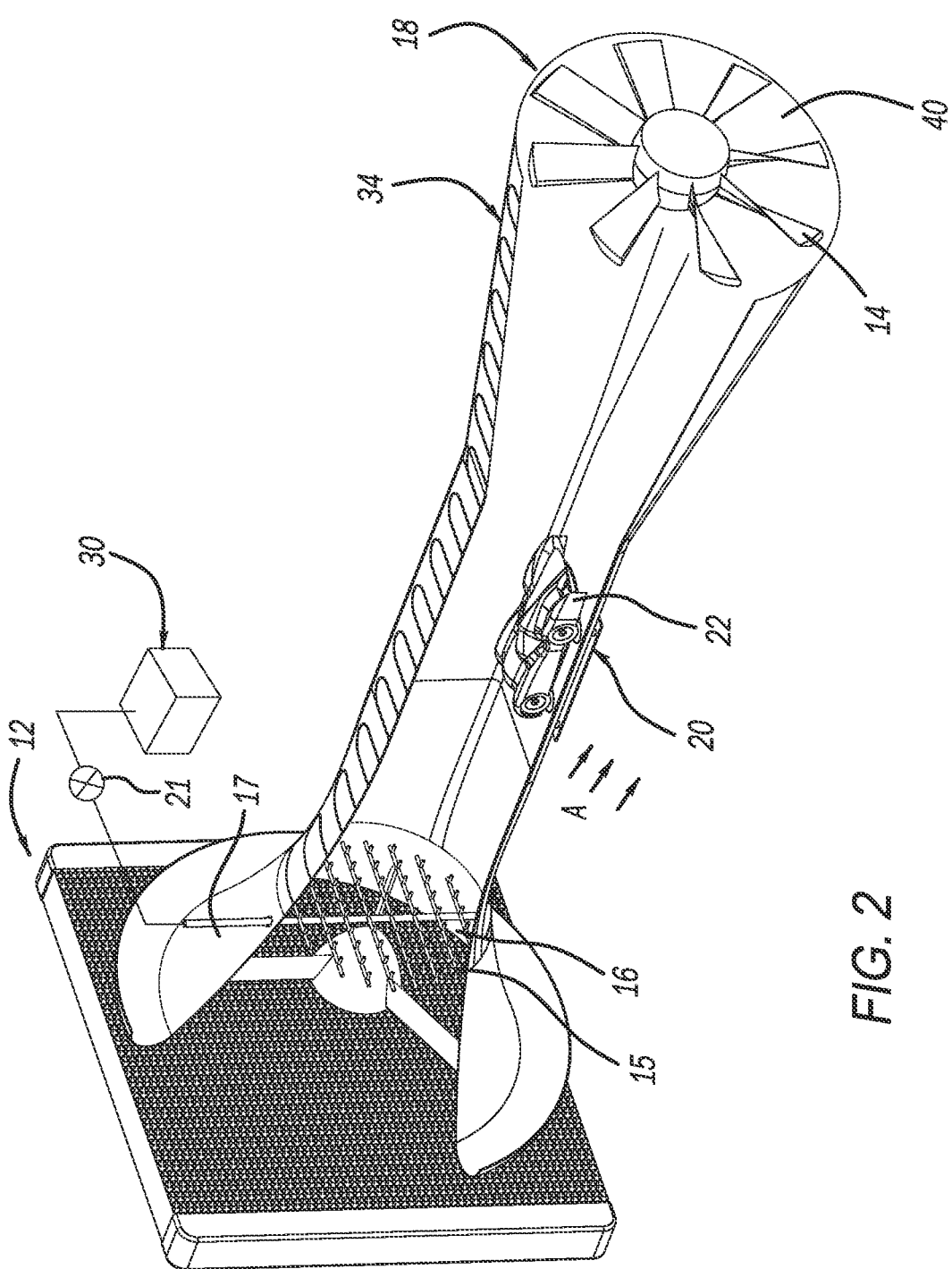
FIG. 2 is an isometric perspective view of the aerodynamic testing system illustrated in FIG. 1.

FIG. 1 and FIG. 2 illustrate an example aerodynamic testing system 10 according to a principle of the present disclosure. Testing system 10 may include, among other elements and features, a chiller 12, an air induction device such as a fan 14, a fluid dispersion device for dispersing a fluid such as a water, a wind tunnel 18, and a load cell 20 that is configured to support an object 22 to be aerodynamically tested using test system 10. Test system 10 may further include a controller 32 and a processing device such as a computer 38 that includes a memory (not shown), a storage medium (not shown), and processor (not shown). Controller 32 may be separate from processing device 38, or part of processing device 38. Processing device 38 may be programmed with software stored in the memory and/or storage medium and executed by processor that is configured to analyze data generated during use of test system 10.

In the illustrated example, the wind tunnel 18 may be an open-circuit wind tunnel including an inlet 24 in the shape of a bellmouth that radially inwardly narrows as it transitions to a middle portion 26 such that as air is drawn into inlet 24 by air induction device 14 a velocity of the air will increase, and an outlet 28 that radially expands and is configured to diffuse the air as it exits wind tunnel 18. Each of inlet 24, middle portion 26, and outlet 28 may be defined by walls 40 that may be formed of any material known to one skilled in the art including thermally conductive or thermally insulating materials such as metal (e.g., steel, aluminum, etc.) and polymeric material.

As will be described in more detail below, walls 40 may include at least one heating element 34. Heating element(s) 34 may be attached to an interior surface of walls 40, or preferably embedded within or attached to an exterior surface of walls 40. In any of these configurations, heat generated by heating element(s) 34 is transferred to walls 40. By embedding the heating element(s) 34 within the walls 40 or attaching heating element(s) 34 to the exterior surface of walls 40, the interior surface of walls 40 may retain a generally smooth and aerodynamic finish, such that turbulence is minimized in wind tunnel 18 and laminar flow may be ensured.

Chiller 12 may be located proximate to inlet 24 and upstream from fluid dispersion device 16. Chiller 12 is configured to cool air A drawn into inlet 24 by air induction device 14. In this regard, chiller 12 may circulate a coolant through a plurality of conduits (not shown) that as the air A drawn by air induction device 14 passes through chiller 12 before entering inlet 24 cools the air A to a desired temperature. Chiller 12 may be in communication with controller 32, which may be in communication with a temperature sensor 33 that is configured to generate signals indicative of a temperature of the air A after is passes through chiller 12. Temperature sensor 33 may be located either upstream (as illustrated) or downstream from fluid dispersion device 16. Based on the signals indicative of temperature of the air A generated by temperature sensor 33 and communicated to controller 32, controller 32 may instruct chiller 12 to either increase or decrease cooling of the air A, which can be accomplished, for example, by controller 32 increasing or decreasing a speed of a pump (not shown) of chiller 12 that pumps the coolant through the conduits (not shown) of chiller 12.

The air induction device 14 may preferably be located at outlet 28. Specifically, air induction device 14 may be located within the walls 40 of outlet 28, or located exterior (i.e., downstream) from outlet 28. The air induction device 14 may include a plurality of blades and, as noted above, is configured to draw air A into wind tunnel 18. Air induction device 14 is preferably located at outlet 28 so that the air A smoothly flows through wind tunnel 18 without any rotational influence that may occur due to the rotating blades of the air induction device 14. The air induction device 14 may be in communication with controller 32. In this regard, based on the desired velocity of the air flow A that passes through wind tunnel 18, controller 32 can increase or decrease the rotation velocity of air induction device 14. The air induction device 14 may further include a heating element (not shown) that may be activated (e.g., by controller 32) to reduce icy buildup on the blades of air induction device 14 during aerodynamic testing of test object 22.

Figure 5:
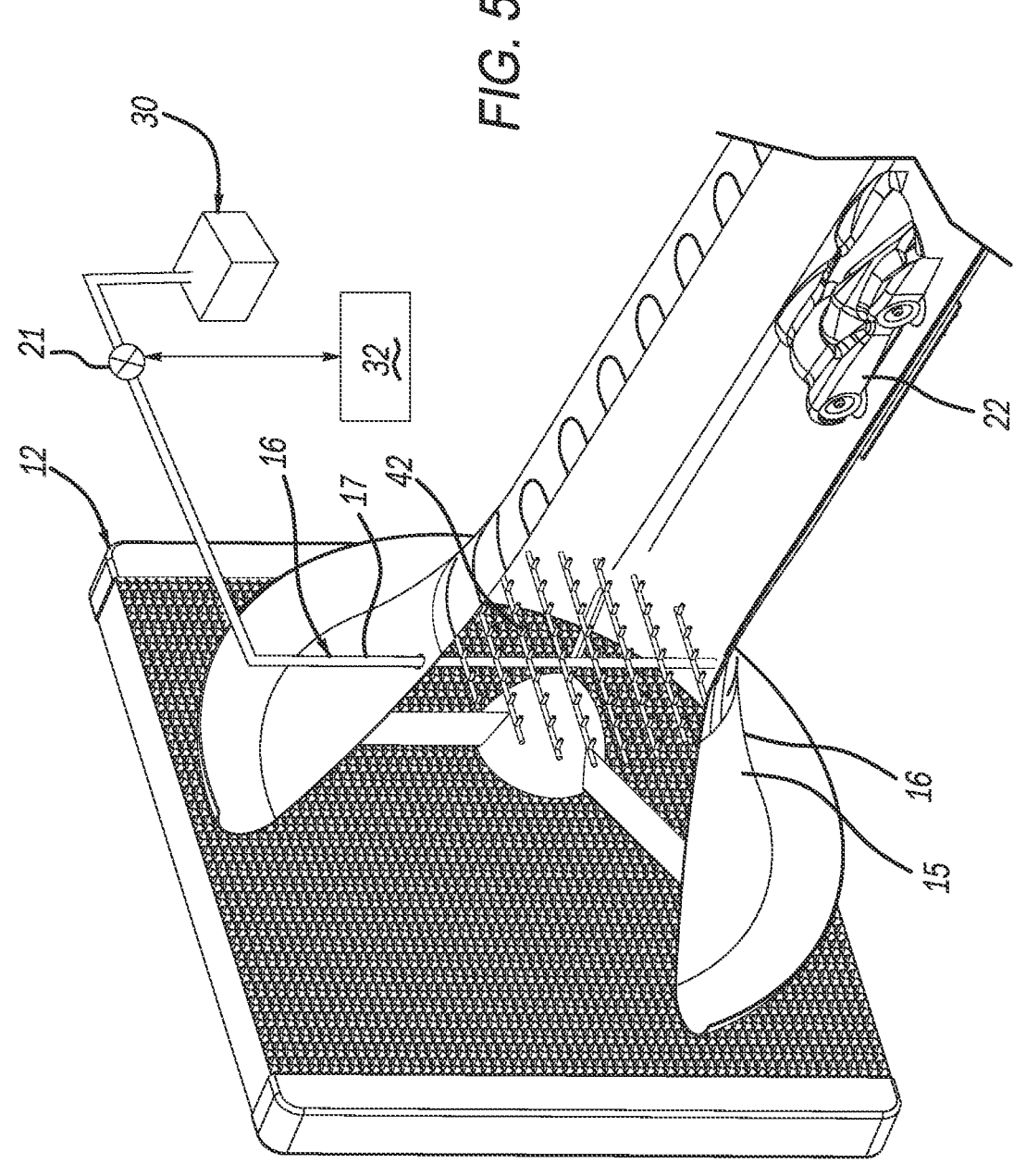
FIG. 5 is an enlarged isometric perspective view of a chiller and water dispersion system of the system illustrated in FIGS. 1 and 2, according to a principle of the present disclosure.

Fluid dispersion device 16, as best viewed in FIGS. 1, 2, and 5, is located downstream from chiller 12 and upstream from test object 22. While located downstream from chiller 12, fluid dispersion device 16 may be located within the bellmouth shape of inlet 24 or within middle portion 26 so long as fluid dispersion device 16 is located upstream from test object 22. Fluid dispersion device 16 is configured to disperse a fluid such as water as a mist of fine droplets and, therefore, is in communication with a reservoir or other source 30 of the liquid. Dispersion device 16 may include a primary conduit 17 in communication with liquid source 30 and a plurality of secondary conduits 19 each having plurality of nozzles 42 oriented to and configured to disperse a very fine mist of the liquid (e.g., water) into the airflow A passing through the wind tunnel 18. Secondary conduits 19 may be oriented vertically, horizontally, or in a grid-like pattern, as desired. The liquid in the fluid dispersion device may be water, water adulterated to alter or enhance the desired properties of deposition and/or adherence to low pressure areas of the test object 22, or another liquid suitable to the purpose of aerodynamic testing. A valve 21 that controls whether the liquid can flow from liquid source 30 to nozzle 42 may be in communication with controller 32 such that controller 32 can open and close valve 21 as needed to disperse the liquid into the air flow A.

Figure 3:
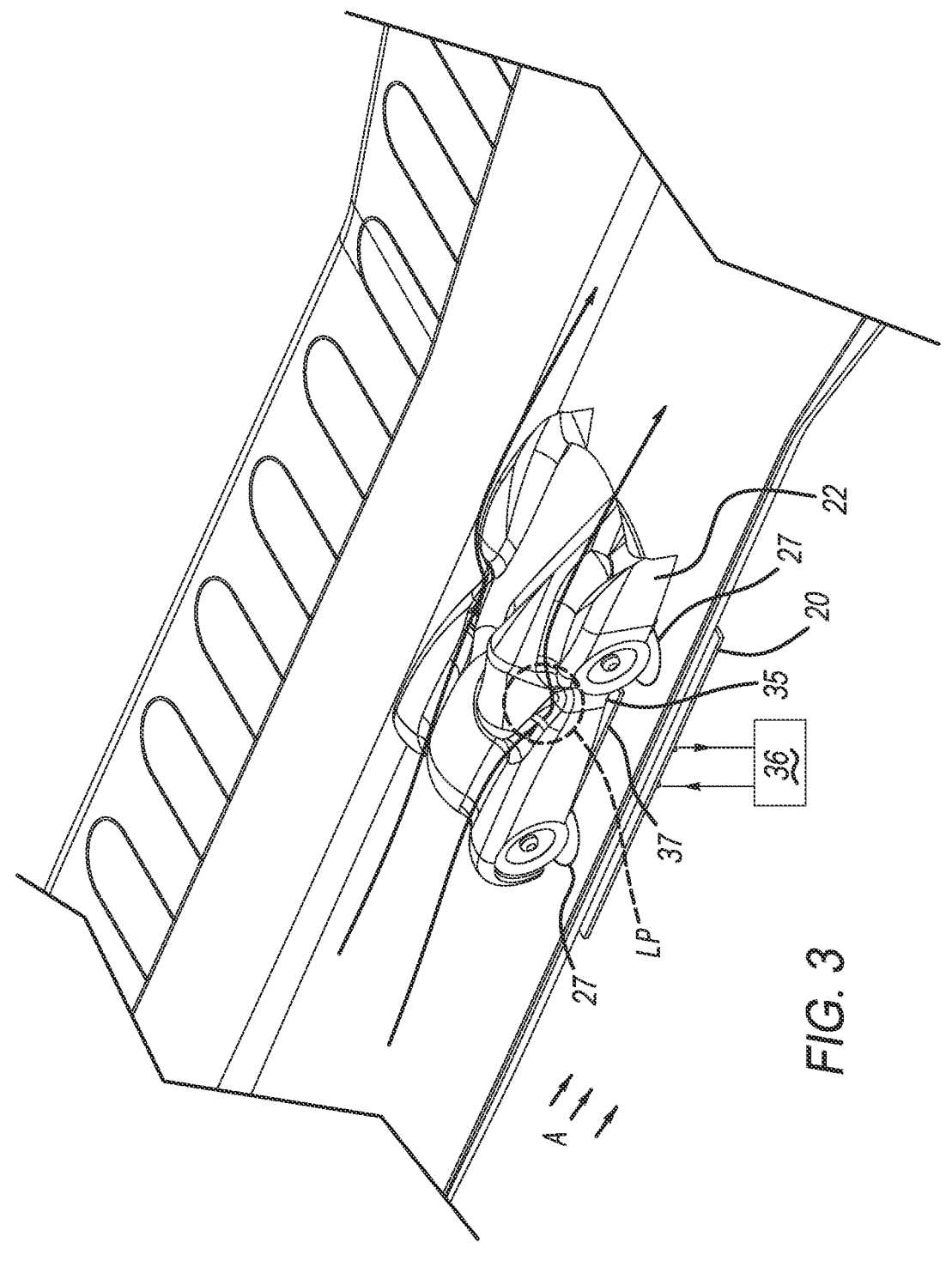
FIG. 3 is an isometric perspective view of a test object located in the system illustrated in FIGS. 1 and 2, according to a principle of the present disclosure.
Figure 4:
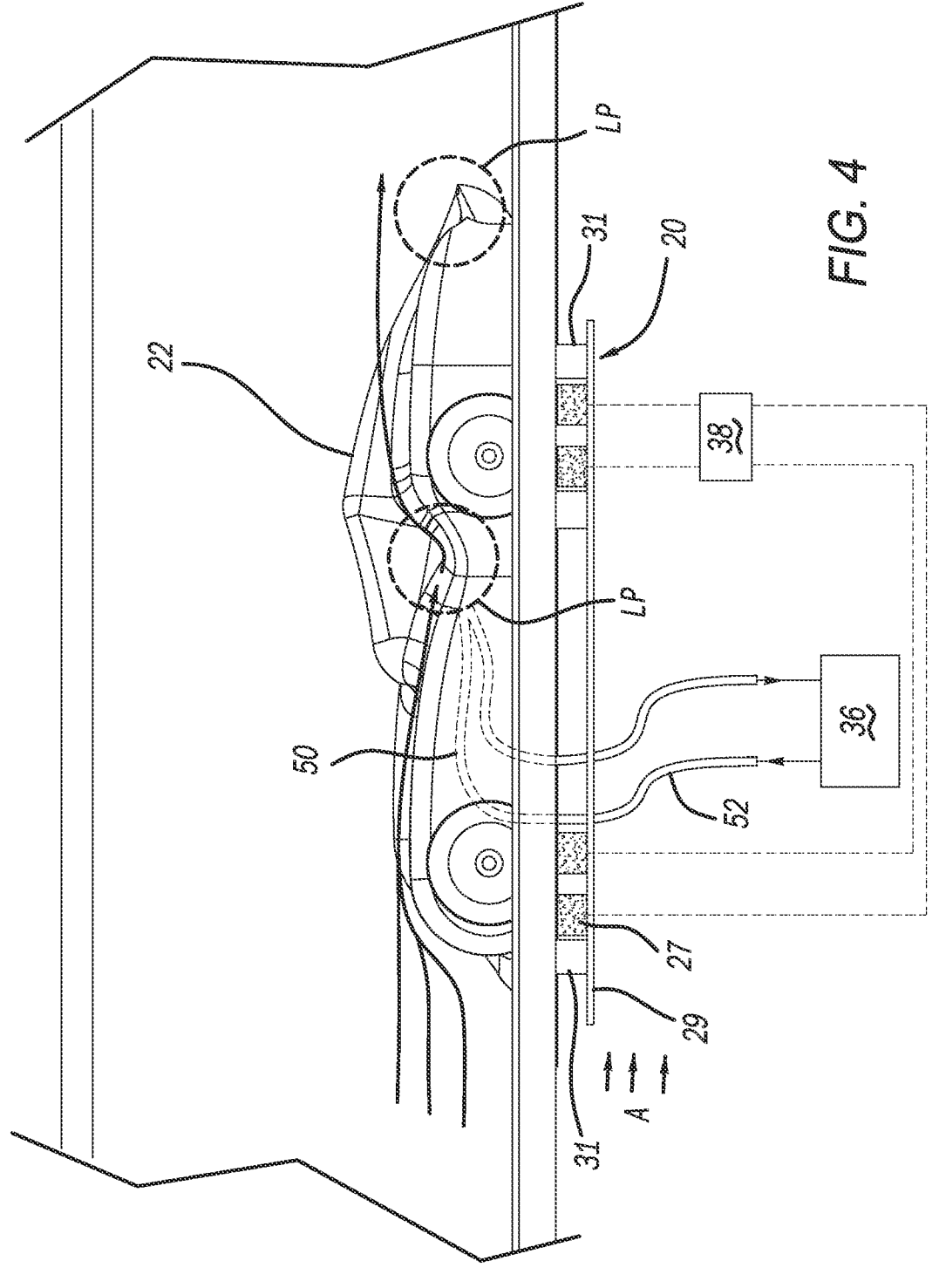
FIG. 4 is a side perspective view of the test object located on a load cell of the system illustrated in FIGS. 1 and 2, according to a principle of the present disclosure.

The load cell 20, as best viewed in FIG. 3 and FIG. 4, is located within the middle portion 26 of wind tunnel 18. The load cell 20 may include, for example, one or more precision transducers 27 and an optional support plate 37. In the illustrated embodiment, transducers 27 extend through wall 40 and are configured to have test object 22 (e.g., the wheels of test object) rest thereon. Transducers 27 may be mounted to a balance plate 29 located beneath middle portion 26 of wind tunnel 19, with balance plate 29 connected to wall 40 of wind tunnel 18 by spacers 31. Transducers 27 are configured to monitor forces exerted on test object 22 by the airflow A, and this data can be used to determine how to adjust the aerodynamic properties of test object 22. More particularly, the transducers 27 of load cell 20 are in communication with processing device 38, and are configured to communicate signals indicative of the forces exerted on test object 22 by air flow A to processing device 38 for storage in the storage medium therein and analysis by the software/algorithms stored therein.

As best shown in FIG. 3, load cell 20 may include cooling system including a source or reservoir 36 of refrigerant that can be used to cool test object 22. Reservoir 36 can be in communication with support plate 37 upon which test object 22 rests, or with a flow path 50 provided within test object 22 such that a temperature of test object 22 can be controlled based on a temperature of the refrigerant. If system 10 includes a support plate 37 in communication with the reservoir 36, an underbody 35 of test object 22 is configured to rest on support plate 37 such that test object 22 is in thermal communication with support plate 37 and a temperature of test object 22 can be controlled based on the temperature of support plate 37, as will be described in more detail later.

Preferably, reservoir 36 is in communication with flow path 50 of test object 22. In such a case, it should be understood that flow path 50 of test object 22 is in communication with the refrigerant source or reservoir 36 via flexible hoses 52 such that the temperature of test object 22 can be controlled based on a temperature of the refrigerant flowing through the flow path 50. The hoses 52 are flexible to ensure that the forces exerted by air flow A on test object 22 are not affected by the hoses 52. That is, if hoses 52 were rigid, the hoses 52 may act as a load path transferring the aerodynamic forces on the test object 22 to a floor (i.e., wall 40) of the wind tunnel 18.

Regardless whether test system 10 includes a cooled support plate, a test object 22 having a flow path 50, or both, it should be understood that the floor (i.e., wall 40) beneath test object 22 includes at least one of the heating elements 34 to prevent the buildup of ice or snow when the fluid dispersed by dispersion device 16 is passing through wind tunnel 18 to avoid the transducers 27 from being unable to generate the signals indicative of the forces exerted on the test object 22 by the air flow A. By using transducers 27 to collect force measurements exerted on test object 22 by air flow A from longitudinal, lateral, and vertical directions, engineers may be able to determine the areas of the aerodynamic shape of the test object 22 that create the most drag, and also whether the aerodynamic shape of the test object 22 when exposed to air flow A can cause the test object 22 move undesirably when in use (i.e., driven).

During aerodynamic testing using the wind tunnel 18, the test object 22, as best viewed in FIG. 3 and FIG. 4, is located upon the transducers 27 of the load cell 20 and the test object 22 is cooled by the refrigerant flowing through at least one of the support plate 27 (if part of system 10) and the flow path 50. In the example embodiment, the test object 22 may be a scaled model of a motor vehicle so that system 10 and wind tunnel 18 can be of a substantially reduced size in comparison to a wind tunnel that is configured to, for example, accommodate full-size motor vehicles. The test object 22 may be comprised of any material known to one skilled in the art including clay materials, wood materials, polymeric materials, and metal materials. Preferably, test object 22 is formed of a material (e.g., metal) that can easily be chilled by at least one of the coolant flowing through support plate 37 or the flow path 50 of test object 22.

As noted above, test system 10 includes a chiller 12 and fluid dispersion device 16. Chiller 12 may cool the air A as it enters wind tunnel 18 to a temperature below freezing (e.g., less than 32 degrees F.) such that, when fluid dispersion device 16 dispenses fine droplets of water into wind tunnel 18, the fine droplets may freeze and turn to snow. As the snow travels toward test object 22, which is being chilled to temperatures at, around, or below freezing, the snow may adhere to the test object 22.

More particularly, the snow will tend to collect on the chilled test object 22 at low-pressure points of the aerodynamic shape of the test object 22. As time elapses and the chilled air flow A including the fine droplets of water/snow continues to pass over test object 22, the collected snow will begin to modify the aerodynamic profile of test object 22 into the most efficient aerodynamic shape possible. As the profile of test object 22 is changed, load cell 20 (i.e., transducers 27) will transmit signals indicative of the forces being exerted on the test object 20 by the air flow A to processing device 38 for storage and analysis. Wind tunnel 18 can be configured to be opened (i.e., include a door) (not shown) proximate middle portion 26 that enables test object 22 to be removed and 3D scanned to record its modified shape, and then relocated in middle portion 26 to continue further testing. Once testing is complete, processing device 38 is configured to store a record of the drag forces exhibited by test object 22 as well as store a 3D scanned vehicle shape for conversion into a computer-aided drafting (CAD) file of the most efficient aerodynamic shape of test object 22.

Figure 6:
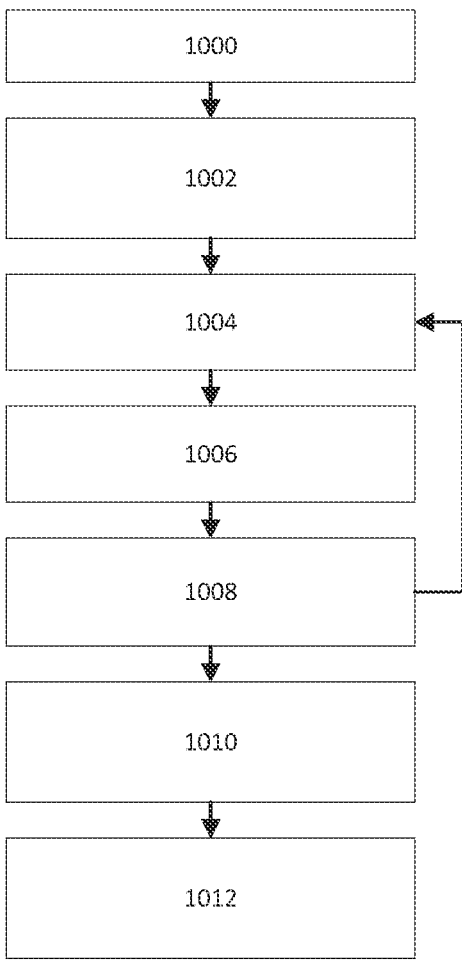
FIG. 6 is a flow chart of an example method of aerodynamic shape testing according to a principle of the present disclosure.

Referring to FIG. 6, a flow chart of an example method of the present disclosure is shown.

At step 1000, the test object 22 is introduced into the wind tunnel 18. As stated above, the test object 22 may be a scaled model. The test object 22 may be placed upon transducers 27 of load cell 20, and the test object 22 will be chilled by the refrigerant flowing between refrigerant source 36 and either the support plate 37 or flow path 50 to at, around, or below freezing to ensure deposition of the water/snow that is part of air flow A.

Further, at this initial step, the heating element 34 may be activated by controller 32 to heat walls 40 to an above-freezing temperature prevent the buildup of ice/snow in the wind tunnel 18 and especially in the area of wind tunnel 18 located beneath test object 22 and proximate load cell 20 that may lead to a non-desired increase in turbulence of the airflow A or influence operation of transducers 27, which may reduce the accuracy of force measurements performed by the load cell 20.

At step 1002, a controlled airflow mixture of cold air and water vapor at a temperature at, around, or below freezing is blown over the test object 22.

At this step, the air induction device 14 is activated by controller 32 to draw airflow A through the inlet 24 of wind tunnel 18. As stated above, the controlled airflow may be of variable velocity, and the velocity of airflow A is selected to be the most suitable for deposition of the water/snow upon the test object 22. Prior to entering the inlet 24, airflow A is drawn by air induction device 14 through chiller 12 that is also activated by controller 32. As the air flow A passes through chiller 12, the airflow A is cooled to a temperature at, around, or below freezing. This chilling process ensures that the air A entering the wind tunnel 18 is at the optimal temperature to facilitate the desired freezing conditions.

As the chilled air A continues through the inlet 24, the air flow A next flows past the dispersion device 16, whose valve 21 has been opened by controller 32 to permit the fluid to be ejected by nozzles 42 as a fine mist of droplets, or vapor, into the chilled airflow A.

Figure 7:
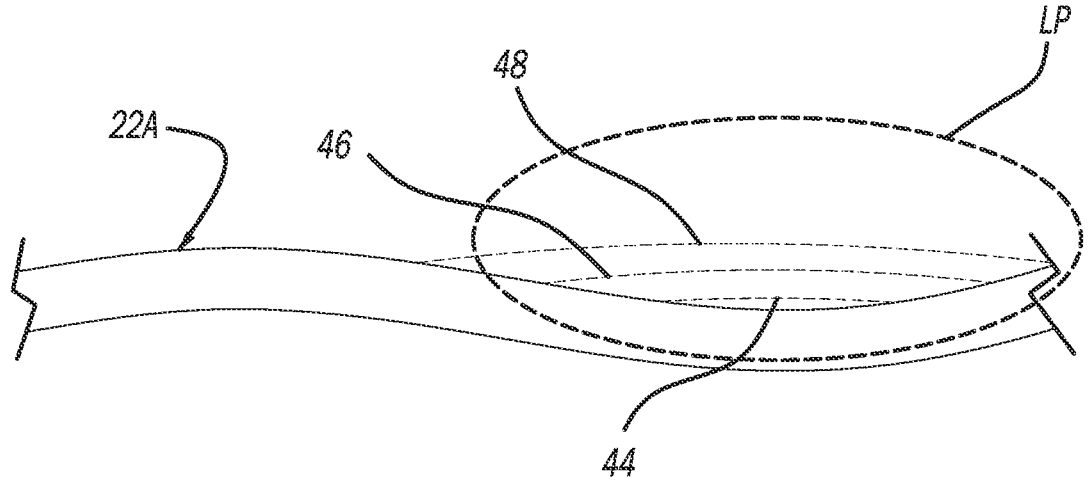
FIG. 7 is an enlarged view of the surface of the test object according to a principle of the present disclosure.

At step 1004, the controlled airflow mixture of cold air and water vapor or droplets passes over the test object 22, where, as noted above, the vapor/droplets can collect or deposit to the low-pressure areas LP (see FIGS. 3 and 4) of the test object 22. As illustrated in FIG. 7, this continuous deposition upon test object's surface 22A may result in the deposit of layers of snow and/or ice adhering to the surface. Over a period of time, these deposit layers (e.g., first deposit layer 44, second deposit layer 46, third deposit layer 48) may fill in the low-pressure areas LP of the test object 22 and lead to a modification of its aerodynamic shape.

At step 1006, the forces on the test object 18 are measured using the transducers 27 of load cell 20, which are transmitted to and recorded by processing device 38.

At step 1008, the wind tunnel 18 may be opened so that test object 22 can be removed and 3D scanned to record the modified shape of the test object 22.

Alternatively, at this step, a 3D scan of the current shape of the test object 22 may be achieved in an automated fashion without opening the wind tunnel 18. In one example, integrated laser scanners (not shown) within the wind tunnel 18 may capture the shape of the test object 22 in real-time.

In another example, structured light projection may be performed by projecting a grid pattern onto the test object 22 and allowing cameras (not shown) to capture the changes in aerodynamic shape of test object 22 as the buildup of ice/snow occurs. In another example, continuous photogrammetry techniques, using multiple cameras (not shown) positioned around the middle portion 26, may be used to reconstruct the 3D shape of the test object 22 based on images captured by the multiple cameras.

At step 1010, the measured force data and corresponding 3D scans are associated and stored in the storage medium of processing device 38.

Following step 1010, the flow chart may return to step 1004 and repeat with the objective of obtaining a plurality of force data points and associated 3D scans from which an optimal aerodynamic shape may be determined.

At step 1012, the most aerodynamically efficient solution may be identified. This determination may be made by analyzing the history of forces recorded for the test object 22 by the load cell 20 as the controlled airflow mixture of cold air and water vapor forms layers of ice and/or other deposit on the surface of the test object 22. In one example, the determination may be made determining the lowest recorded drag force on the test object 22. In another example, the determination may be made by analyzing drag forces, lift forces, and/or other aerodynamic forces on the test object 22 to arrive at a compromise of aesthetic appeal and optimized aerodynamics. Once the determination is made, the associated 3D scans of the test object 22 at the moment the measured forces on the test object 22 reached the determined aerodynamic efficiency may be retrieved from the storage medium of processing device 38.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A test system for modifying an aerodynamic shape of a test object, comprising:
   an open-circuit wind tunnel configured for receipt of a mixture of cold air and water vapor;
   a heating element formed on walls of the open-circuit wind tunnel, the heating element being configured to heat the walls to a temperature above freezing; and
   a load cell configured to support the test object in the open-circuit wind tunnel during testing thereof, the load cell including a plurality of transducers and a coolant system for chilling the test object,
   wherein the transducers are configured to generate signals indicative of forces applied to the test object as the mixture of cold air and water vapor passes over the test object to determine amounts of drag created by the aerodynamic shape of the test object, and
   wherein the coolant system is configured to chill the test object to a temperature at or below freezing.

2. The test system of claim 1, further comprising:
   a chiller located at an entrance of an inlet of the open-circuit wind tunnel;
   an air induction device configured to draw air through the chiller before entering the inlet to form the cold air, and draw the cold air through the open-circuit wind tunnel toward the test object supported by the load cell; and
   a fluid dispersion device located downstream from the chiller for dispersing water vapor in the open-circuit wind tunnel,
   wherein the mixture of cold air and water vapor is at a temperature between 14 degrees F. and 32 degrees F. as it passes through the open-circuit wind tunnel.

3. The test system of claim 2, wherein the coolant system includes a source of coolant configured to circulate between the source and a flow path provided in the test object.

4. The test system of claim 3, further comprising a fluid source in communication with the fluid dispersion device, and a valve between the fluid source and the fluid dispersion device.

5. The test system according to claim 4, further comprising a temperature sensor downstream from the chiller for generating signals indicative of a temperature of the cold air.

6. The test system according to claim 5, further comprising a controller in communication with each of the chiller, the air induction device, the valve, and the temperature sensor.

7. The test system according to claim 6, wherein the controller is configured to control the chiller based on the signals indicative of the temperature generated by the temperature sensor.

8. The test system of claim 1, further comprising a processing device in communication with the plurality of transducers and configured to store and analyze the signals indicative of the forces applied to the test object as the mixture of cold air and water vapor passes over the test object to determine the amounts of drag created by the aerodynamic shape of the test object.

9. A method for modifying an aerodynamic shape of a test object, comprising:
   introducing the test object into an open-circuit wind tunnel and locating the test object onto a load cell including a coolant system configured to cool a temperature of the test object to a temperature at or below freezing;
   activating a heating element formed on walls of the open-circuit wind tunnel, the heating element being configured to heat the walls to a temperature above freezing;
   activating an air induction device to draw a mixture of cold air and water vapor at a temperature at or below freezing over the test object; and
   measuring forces exerted on the test object by the mixture of cold air and water vapor using the load cell,
   wherein as the mixture of cold air and water vapor passes over the test object that is cooled to the temperature at or below freezing by the coolant system, the water vapor will freeze and collect at low pressure areas of the test object to change and improve the aerodynamic shape of the test object.

10. The method according to claim 9, further comprising 3D scanning the test object to record the changes and improvement in the aerodynamic shape of the test object.

11. The method according to claim 10, further comprising:
   storing the measured forces exerted on the test object by the mixture of cold air and water vapor and the corresponding 3D scans in a processing device; and
   identifying a most aerodynamically efficient shape of the test object based on the measured forces and corresponding 3D scans.

12. The method of claim 9, wherein the mixture of cold air and water vapor is at a temperature between 14 degrees F. and 32 degrees F.

13. The method according to claim 9, wherein the test object is formed of a metal material to facilitate cooling by the coolant system.

14. A test system for modifying an aerodynamic shape of a test object, comprising:

an open-circuit wind tunnel configured for receipt of a mixture of cold air and water vapor;

a chiller located at an entrance of an inlet of the open-circuit wind tunnel;

an air induction device configured to draw air through the chiller before entering the inlet to form the cold air, and draw the cold air through the open-circuit wind tunnel toward the test object supported by a load cell;

a fluid dispersion device located downstream from the chiller for dispersing water vapor into the open-circuit wind tunnel, wherein the mixture of cold air and water vapor is at a temperature between 14 degrees F. and 32 degrees F. as it passes through the open-circuit wind tunnel; and a heating element formed on walls of the open-circuit wind tunnel that is configured to heat the walls to a temperature above freezing and prevent the water vapor from collecting on the walls, wherein the load cell includes a plurality of transducers and a coolant system that is configured to cool the test object to a temperature at or below freezing, and as the mixture of cold air and water vapor passes over the test object that is cooled to the temperature at or below freezing by the coolant system, the water vapor will freeze and collect at low pressure areas of the test object to change and improve the aerodynamic shape of the test object, and the transducers are configured to generate signals indicative of forces applied to the test object by the mixture of cold air and water vapor as the mixture passes over the test object to determine amounts of drag created by the aerodynamic shape of the test object are reduced by the change and improvement of the aerodynamic shape of the test object.

15. The test system of claim 14, further comprising:

a processing device in communication with the plurality of transducers and configured to store and analyze the signals indicative of the forces applied to the test object as the mixture of cold air and water vapor passes over the test object.

16. The test system of claim 15, wherein the coolant system includes a coolant source configured to circulate a coolant to a flow path provided in the test object.

17. The test system of claim 16, further comprising a fluid source in communication with the fluid dispersion device, and a valve between the fluid source and the fluid dispersion device.

18. The test system according to claim 17, further comprising a temperature sensor downstream from the chiller for generating signals indicative of a temperature of the cold air.

19. The test system according to claim 18, further comprising a controller in communication with each of the chiller, the air induction device, the valve, and the temperature sensor.

20. The test system according to claim 19, wherein the controller is configured to control the chiller based on the signal indicative of the temperature generated by the temperature sensor.

* * * * *